(12) United States Patent
Oshio et al.

(10) Patent No.: US 11,287,260 B2
(45) Date of Patent: Mar. 29, 2022

(54) VIBRATOR DEVICE

(71) Applicant: Seiko Epson Corporation, Tokyo (JP)

(72) Inventors: Masahiro Oshio, Shiojiri (JP); Keiichi Yamaguchi, Ina (JP); Seiichiro Ogura, Minowa (JP); Ryuta Nishizawa, Nagano (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 17/005,400

(22) Filed: Aug. 28, 2020

(65) Prior Publication Data

US 2021/0063156 A1 Mar. 4, 2021

(30) Foreign Application Priority Data

Aug. 29, 2019 (JP) .............................. JP2019-156439

(51) Int. Cl.
*G01C 19/5663* (2012.01)
*G01C 19/5656* (2012.01)

(52) U.S. Cl.
CPC ..... *G01C 19/5663* (2013.01); *G01C 19/5656* (2013.01)

(58) Field of Classification Search
CPC combination set(s) only.
See application file for complete search history.

(56) References Cited

U.S. PATENT DOCUMENTS

| 2006/0169043 | A1* | 8/2006 | McNeil | G01P 15/125 73/514.01 |
| 2008/0173959 | A1* | 7/2008 | Merassi | B81B 3/0051 257/415 |
| 2016/0075549 | A1* | 3/2016 | Aoki | B81B 3/0086 257/417 |
| 2018/0274922 | A1 | 9/2018 | Nishizawa et al. | |

FOREIGN PATENT DOCUMENTS

JP 2018-159674 A 10/2018

* cited by examiner

*Primary Examiner* — Paul M. West
*Assistant Examiner* — Mark A Shabman
(74) *Attorney, Agent, or Firm* — Harness, Dickey & Pierce, P.L.C.

(57) ABSTRACT

A vibrator device includes: a vibrator element that includes a vibrator substrate including a vibrating arm, and an electrode arranged in the vibrator substrate; a base; a support substrate that includes a base mount fixed to the base, an element support that supports the vibrator element, and a beam that connects between the base mount and the element support, and supports the vibrator element relative to the base; a wiring pattern that is arranged in the support substrate, and is electrically connected to the vibrator element; and a buffer member that is arranged on the wiring pattern of the support substrate, and whose hardness is lower than that of the support substrate. Also the buffer member is arranged on a face of the support substrate, that opposes the vibrator element, and overlaps the vibrating arm in a plan view of the support substrate.

8 Claims, 13 Drawing Sheets

VIBRATOR DEVICE

The present application is based on, and claims priority from JP Application Serial Number 2019-156439, filed Aug. 29, 2019, the disclosure of which is hereby incorporated by reference herein in its entirety.

BACKGROUND

1. Technical Field

The present disclosure relates to a vibrator device.

2. Related Art

JP-A-2018-159674 describes a vibrator device including a base, a vibrator element, and a relay substrate that is provided so as to overlap the vibrator element and fixes the vibrator element to the base.

In a vibrator device configured in this way, a relay substrate and a vibrator element are provided so as to overlap each other, and the gap therebetween is small. Therefore, when a drive arm or a detection arm of the vibrator element is bent in the thickness direction thereof due to an impact or the like from the outside, the drive arm or the detection arm is likely to come into contact with the relay substrate, and there is a risk that the drive arm or the detection arm is damaged due to the contact.

SUMMARY

A vibrator device according to this application example includes:

a vibrator element that includes a vibrator substrate including a vibrating arm, and an electrode arranged in the vibrator substrate;

a base;

a support substrate that includes a base mount fixed to the base, an element support that supports the vibrator element, and a beam that connects between the base mount and the element support, and supports the vibrator element relative to the base;

a wiring pattern that is arranged in the support substrate, and is electrically connected to the vibrator element; and a buffer member that is arranged on the wiring pattern of the support substrate, and whose hardness is lower than that of the support substrate, wherein the buffer member is arranged on a face of the support substrate, that opposes the vibrator element, and overlaps the vibrating arm in a plan view of the support substrate.

In the vibrator device according to this application example, it is preferable that the buffer member overlaps a tip end of the vibrating arm in a plan view of the support substrate.

In the vibrator device according to this application example, it is preferable that the buffer member does not overlap a corner located at the tip end in a plan view of the support substrate.

In the vibrator device according to this application example, it is preferable that the buffer member includes a first portion that overlaps, in a plan view of the support substrate, a corner of the tip end located on one side in a width direction of the vibrating arm, and a second portion that overlaps a corner located on the other side, and the first portion and the second portion are separated in the width direction.

In the vibrator device according to this application example, it is preferable that the buffer member overlaps, in a plan view of the support substrate, the vibrating arm at a position shifted from a tip end toward a based end of the vibrating arm.

In the vibrator device according to this application example, it is preferable that the constituent material of the vibrator substrate is quartz crystal, and the constituent material of the support substrate is quartz crystal.

In the vibrator device according to this application example, it is preferable that the constituent material of the buffer member is metal.

In the vibrator device according to this application example, it is preferable that the wiring pattern includes fixed potential wiring connected to a fixed potential, and the buffer member is electrically connected to the fixed potential wiring.

In the vibrator device according to this application example, it is preferable that defining three axes perpendicular to each other as an A axis, a B axis, and a C axis, the vibrator element and the support substrate are arranged so as to overlap in a direction along the C axis, and the vibrator element includes:

an element base fixed to the element support through a bonding member;

a pair of detection arms, that extend from the element base along the B axis;

a pair of linking arms that extend from the element base along the A axis;

a pair of drive arms, that extend from a tip end of one of the linking arms, along the B axis; and a pair of drive arms, that extend from a tip end of the other of the linking arms, along the B axis.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Hereinafter, a vibrator device of this application example will be described in detail based on embodiments illustrated in the attached drawings.

First Embodiment

Figure 1:
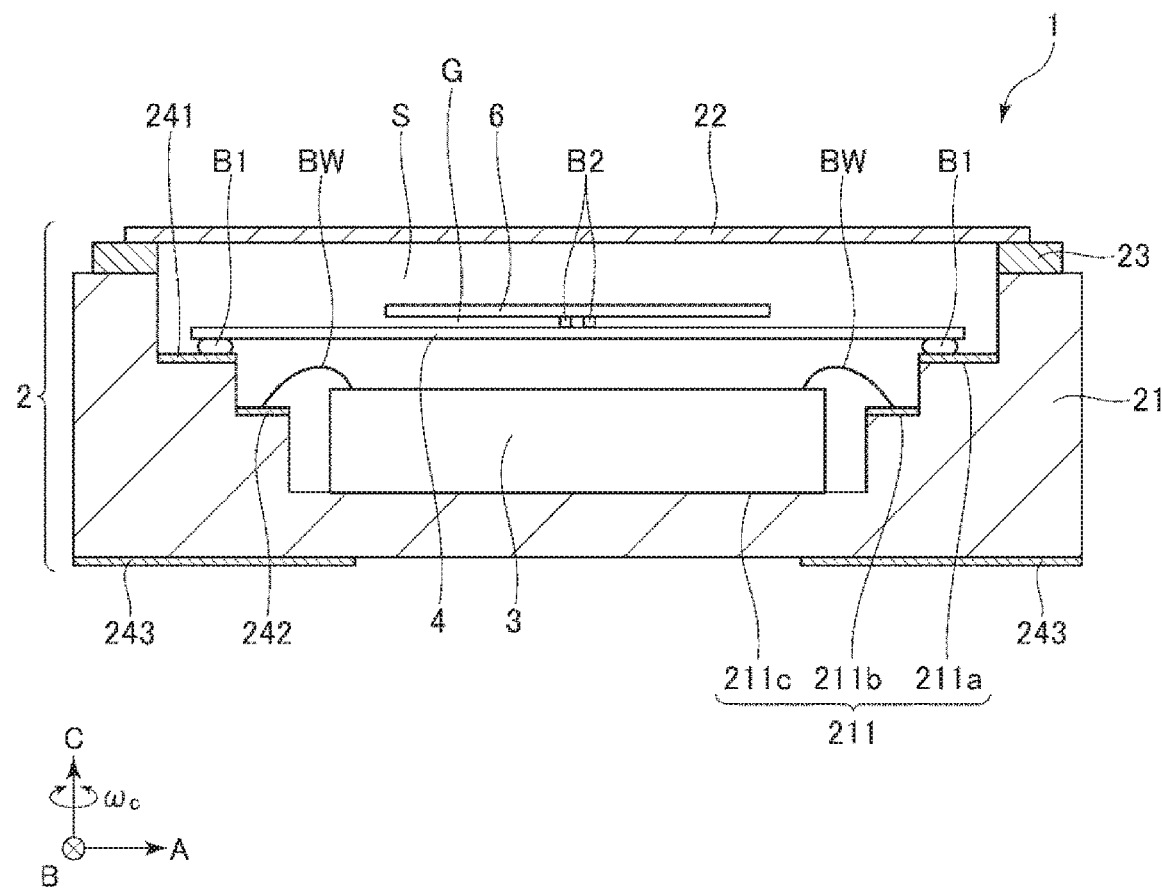
FIG. 1 is a cross-sectional view illustrating a vibrator device according to a first embodiment.
Figure 2:
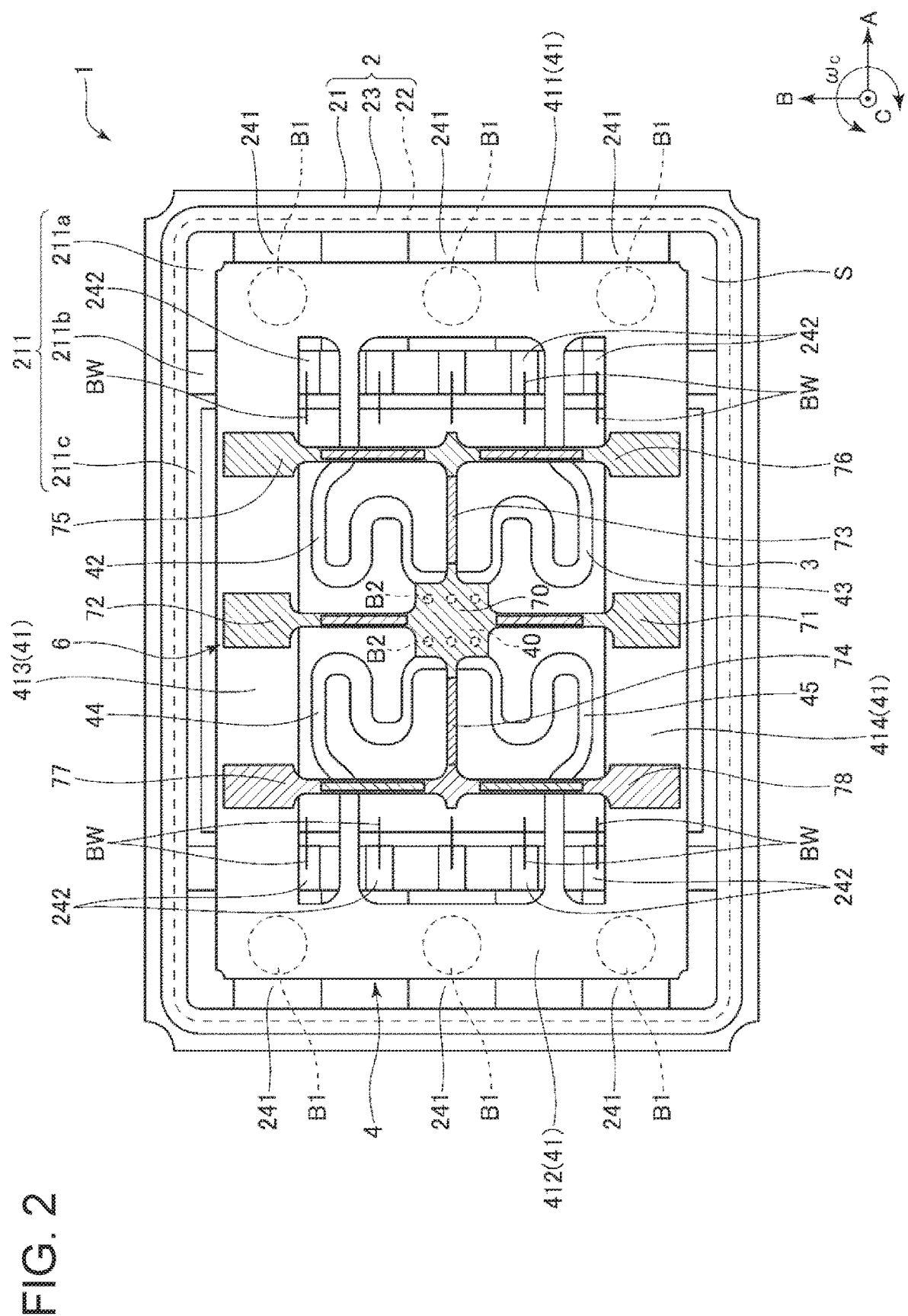
FIG. 2 is a plan view illustrating the vibrator device in FIG. 1.
Figure 3:
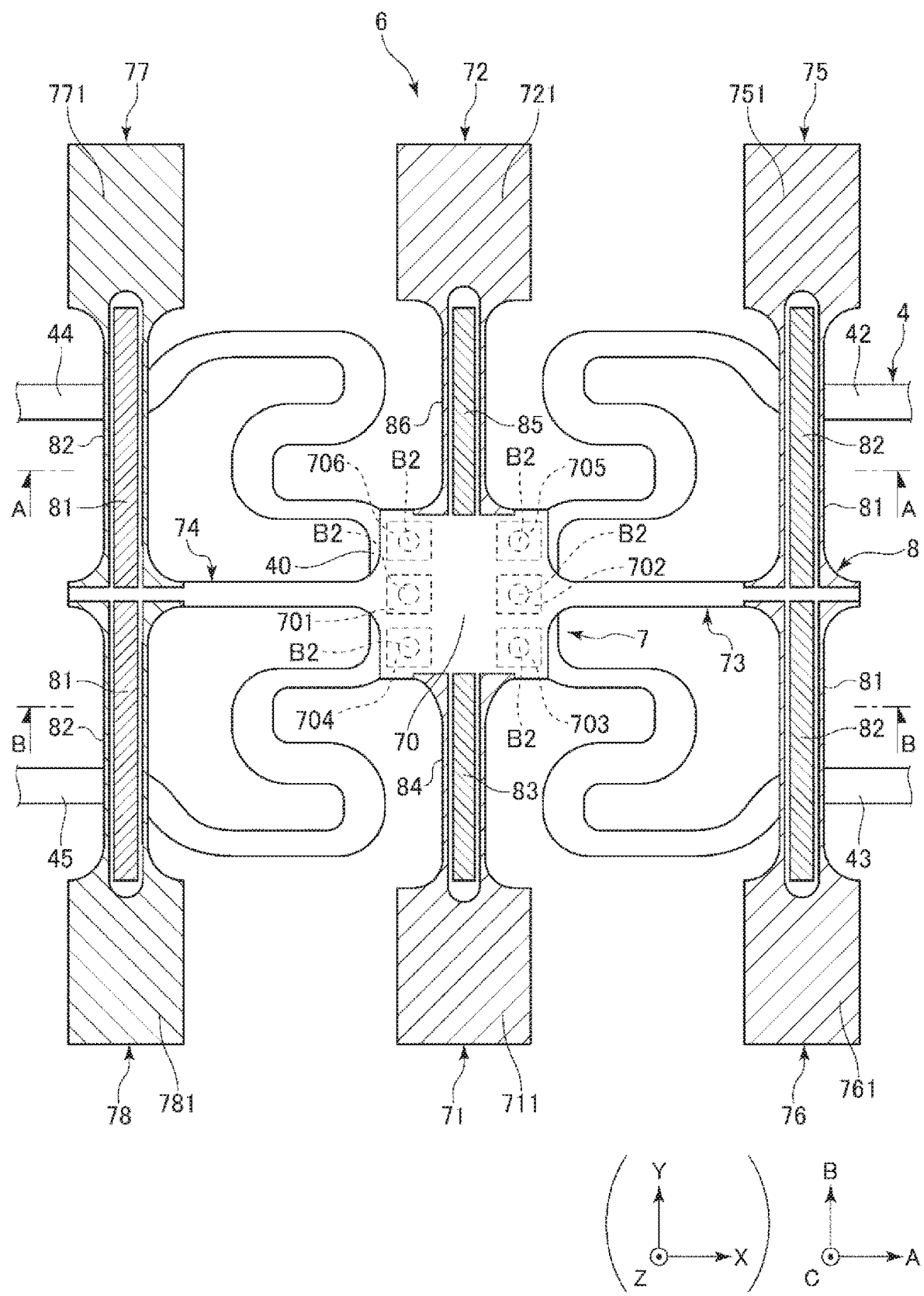
FIG. 3 is a plan view illustrating a vibrator element included in the vibrator device in FIG. 1.
Figure 4:
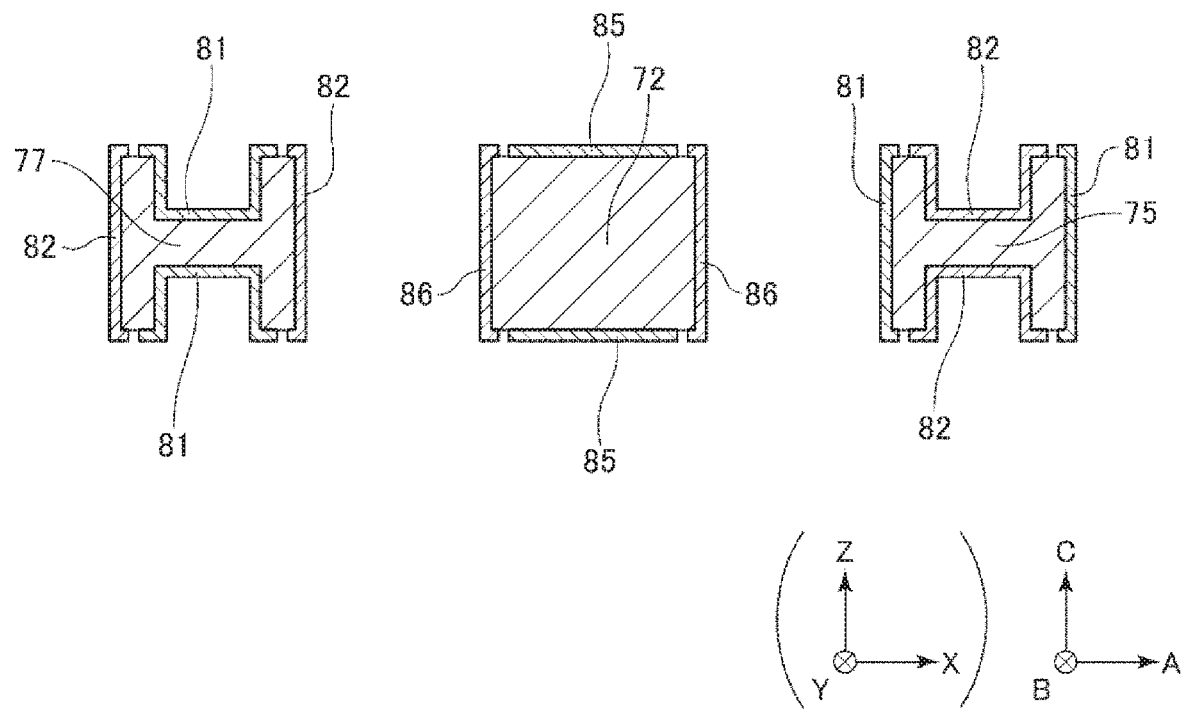
FIG. 4 is a cross-sectional view taken along line A-A in FIG. 3.
Figure 5:
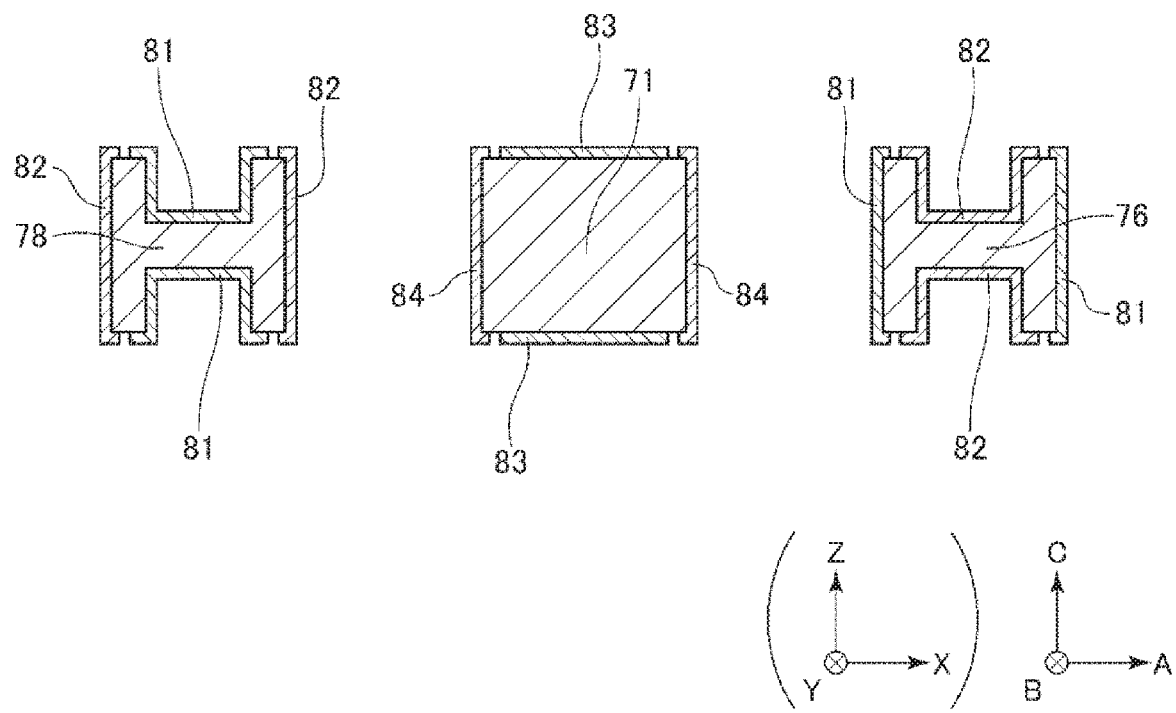
FIG. 5 is a cross-sectional view taken along line B-B in FIG. 3.
Figure 6:
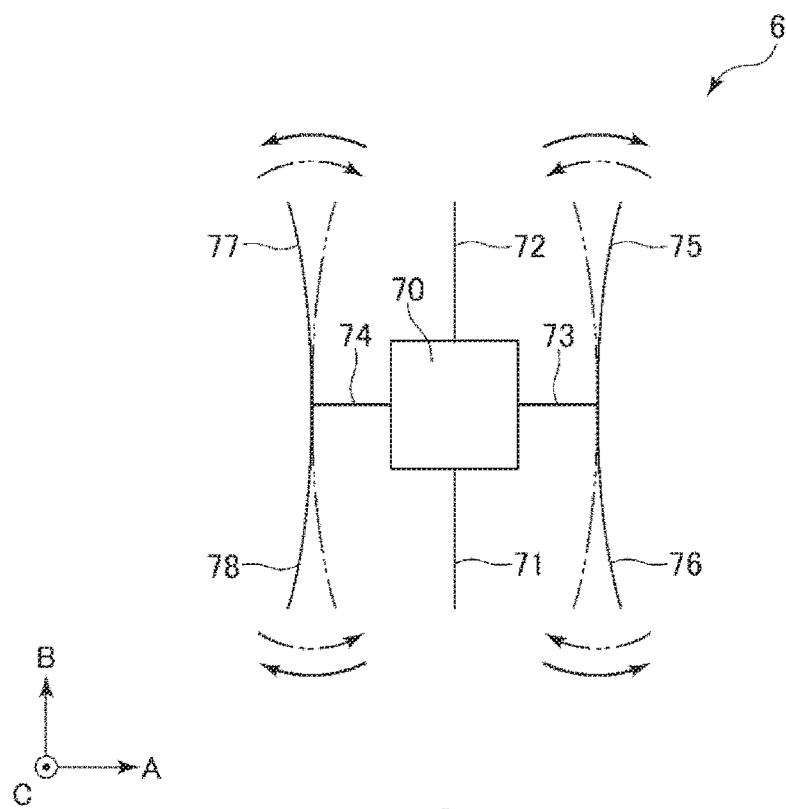
FIG. 6 is a schematic diagram for illustrating driving of the vibrator element in FIG. 3.
Figure 7:
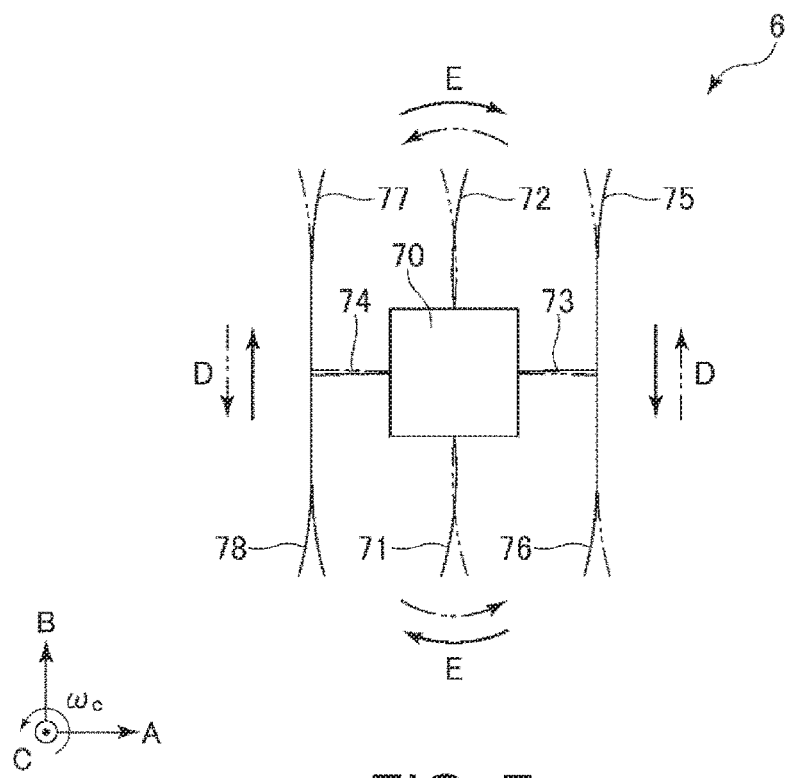
FIG. 7 is a schematic diagram for illustrating driving of the vibrator element in FIG. 3.
Figure 8:
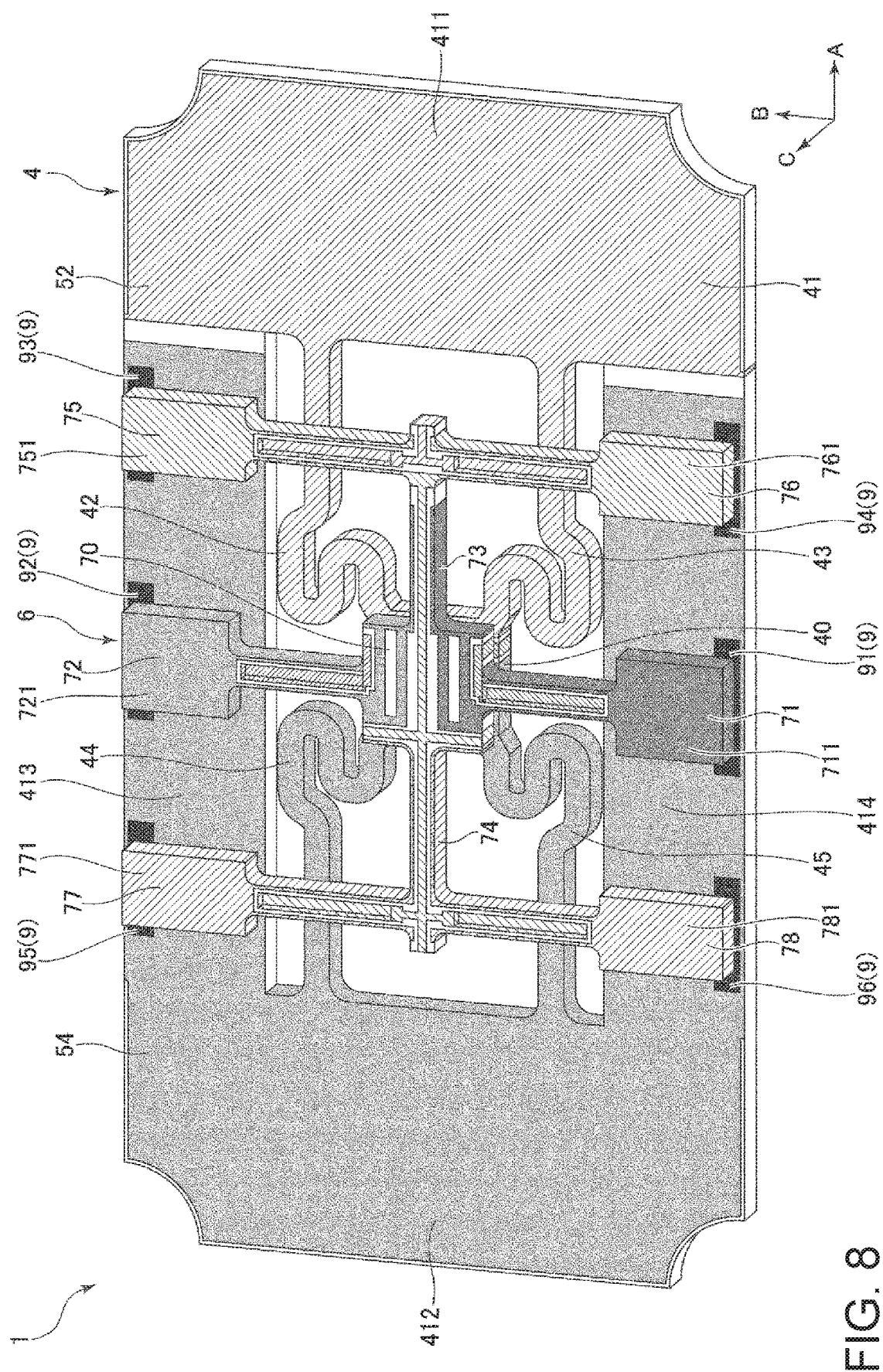
FIG. 8 is a perspective view of a support substrate viewed from an upper face side.
Figure 9:
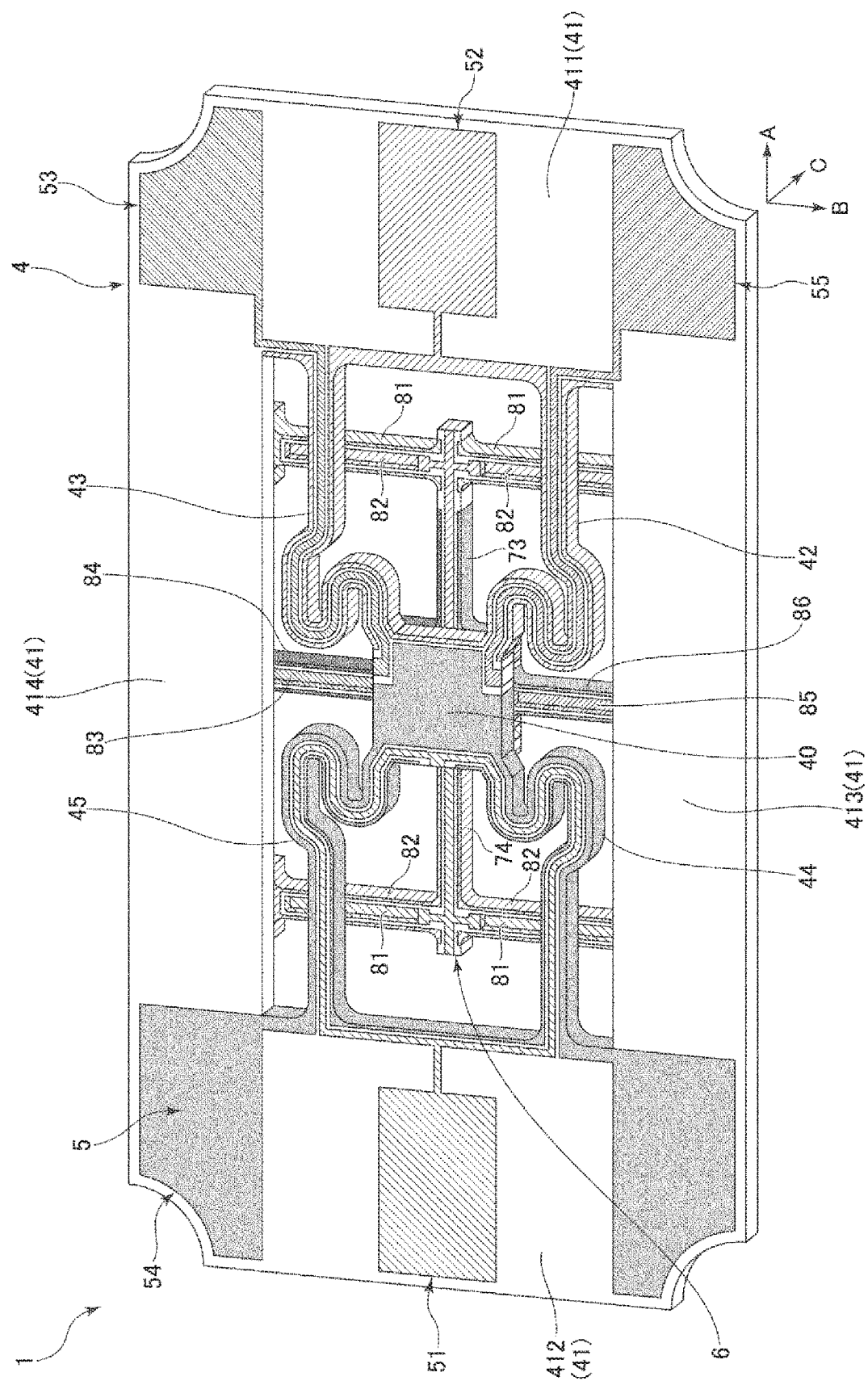
FIG. 9 is a perspective view of the support substrate viewed from a lower face side.
Figure 10:
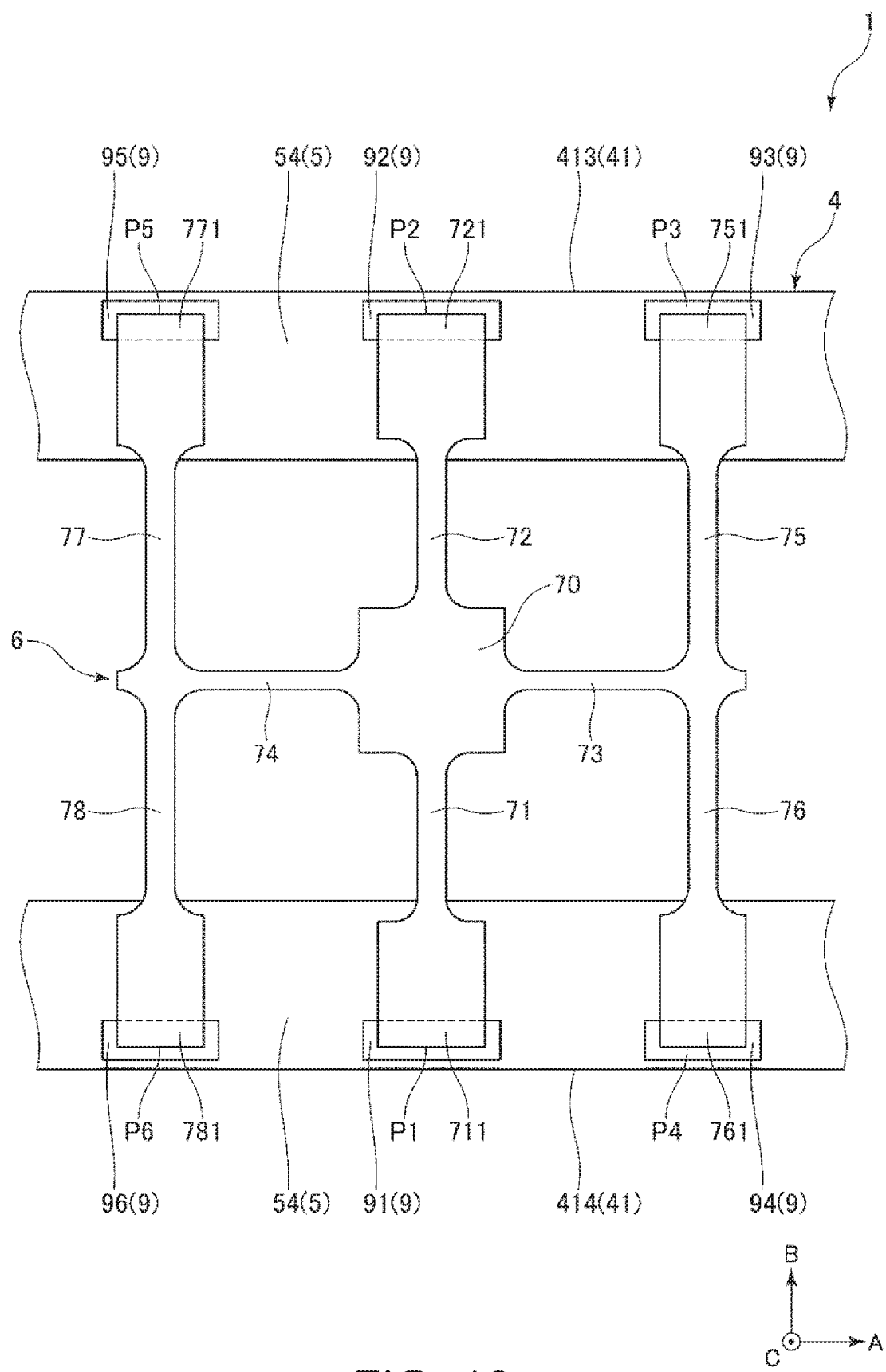
FIG. 10 is a plan view of the support substrate viewed from the above.

FIG. 1 is a cross-sectional view illustrating a vibrator device according to a first embodiment. FIG. 2 is a plan view illustrating the vibrator device in FIG. 1. FIG. 3 is a plan view illustrating a vibrator element included in the vibrator device in FIG. 1. FIG. 4 is a cross-sectional view taken along line A-A in FIG. 3. FIG. 5 is a cross-sectional view taken along line B-B in FIG. 3. FIGS. 6 and 7 are schematic diagrams for illustrating driving of the vibrator element in FIG. 3. FIG. 8 is a perspective view of a support substrate viewed from an upper face side. FIG. 9 is a perspective view of the support substrate viewed from a lower face side. FIG. 10 is a plan view of the support substrate viewed from the above.

Note that, A, B, and C axes that are three axes orthogonal to each other are shown in FIGS. 1 to 10 for the sake of description. Also, in the following, the arrow tip end side of each axis is also referred to as a "plus side", and the other end side is also referred to as a "minus side". Also, the plus side in the C axis is also referred to as an "upper" side, and the minus side is also referred to as a "lower" side. Also, a plan view viewed in the direction along the C axis is also simply referred to as a "plan view".

A vibrator device 1 shown in FIG. 1 is a physical quantity sensor that detects an angular velocity we with the C axis being the detection axis. As a result of using the vibrator device 1 as a physical quantity sensor in this way, the vibrator device 1 can be mounted in a wide range of electronic appliances, and a highly versatile vibrator device 1 in high demand is realized. Such a vibrator device 1 includes a package 2, and a circuit element 3, a support substrate 4, and a vibrator element 6 that are housed in the package 2.

The package 2 includes a base 21 including a recess 211 that opens to an upper face, and a lid 22 that covers the opening of the recess 211 and is joined to the upper face of the base 21 through a bonding member 23. An internal space S is formed inside the package 2 by the recess 211, and the circuit element 3, the support substrate 4, and the vibrator element 6 are housed in the internal space S. For example, the base 21 can be made of ceramics such as alumina, and the lid 22 can be made of a metal material such as Kovar. Note that the constituent materials of the base 21 and the lid 22 are not specifically limited.

The internal space S is airtight, and in a depressurized state, preferably, in a state closer to vacuum. With this, the viscous resistance decreases, and the vibration characteristics of the vibrator element 6 is improved. Note that the atmosphere in the internal space S is not specifically limited, and the internal space S may also be in an atmospheric pressure state or in a pressurized state, for example.

Also, the recess 211 is constituted by a plurality of recesses, and includes a recess 211a that opens to the upper face of the base 21, a recess 211b that opens to a bottom face of the recess 211a and whose opening width is smaller than that of the recess 211a, and a recess 211c that opens to a bottom face of the recess 211b and whose opening width is smaller than that of the recess 211b. Also, the support substrate 4 is fixed to the bottom face of the recess 211a in a state of supporting the vibrator element 6, and the circuit element 3 is fixed to a bottom face of the recess 211c.

Also, as shown in FIG. 2, the vibrator element 6, the support substrate 4, and the circuit element 3 are arranged so as to overlap each other in a plan view, in the internal space S. In other words, the vibrator element 6, the support substrate 4, and the circuit element 3 are arranged side by side along the C axis. With this, the planar extension in the directions along the A and B axes of the package 2 can be suppressed, and the size of the vibrator device 1 can be reduced. Also, the support substrate 4 is located between the vibrator element 6 and the circuit element 3, and supports the vibrator element 6 from the below, that is, from a C axis minus side.

Also, as shown in FIGS. 1 and 2, a plurality of internal terminals 241 are arranged on the bottom face of the recess 211a, a plurality of internal terminals 242 are arranged on the bottom face of the recess 211b, and a plurality of external terminals 243 are arranged on a lower face of the base 21. These internal terminals 241 and 242 and the external terminals 243 are electrically connected through wiring, which is not illustrated, that is formed inside the base 21. Also, the internal terminals 241 are electrically connected to the vibrator element 6 through conductive bonding members B1 and B2 and the support substrate 4, and the internal terminals 242 are electrically connected to the circuit element 3 through bonding wires BW.

The vibrator element 6 is an angular velocity sensor element that can detect an angular velocity we with the C axis being the detection axis, as a physical quantity sensor element. As shown in FIG. 3, the vibrator element 6 includes a vibrator substrate 7 and an electrode 8 arranged on a surface of the vibrator substrate 7. The vibrator substrate 7 is constituted by a Z-cut quartz crystal substrate. The Z-cut quartz crystal substrate extends in an X-Y plane that is defined by an X axis serving as an electrical axis, which is a crystal axis of quartz crystal, and a Y axis serving as a mechanical axis, and has a thickness in the direction along the Z axis serving as an optical axis.

The vibrator substrate 7 includes an element base 70 located in a central portion, detection arms 71 and 72 serving as a pair of vibrating arms that extend from the element base 70 to both sides along the B axis, a pair of linking arms 73 and 74 that extend from the element base 70 to both sides along the A axis, drive arms 75 and 76 serving as a pair of vibrating arms that extend from a tip end portion of the linking arm 73 to both sides along the B axis, and drive arms 77 and 78 serving as a pair of vibrating arms that extend from a tip end portion of the linking arm 74 to both sides along the B axis. As a result of using the vibrator substrate 7 having such a shape, the vibrator element 6 having a superior vibration balance is realized.

Also, wide width portions 711 and 721 wider than base end portions are respectively provided in tip end portions of the detection arms 71 and 72. Similarly, wide width portions 751, 761, 771, and 781 wider than base end portions are respectively provided in tip end portions of the drive arms 75, 76, 77, and 78. Note that these wide width portions 711, 721, 751, 761, 771, and 781 are also referred to as hammer heads. As a result of providing wide width portions 711, 721, 751, 761, 771, and 781, the lengths of the detection arms 71 and 72 and the drive arms 75 to 78 can be reduced, when compared at the same frequency, and the size of the vibrator element 6 can be reduced. Also, as a result of the length of the drive arms 75 to 78 being reduced, the viscous resistance decreases, and the Q factor representing the oscillation characteristics is improved. Note that the configurations of the detection arms 71 and 72 and the drive arms 75 to 78 are not specifically limited, and the wide width portions 711, 721, 751, 761, 771, and 781 may not be included, for example.

Also, as shown in FIGS. 4 and 5, the drive arms 75 to 78 each include a groove that opens to an upper face and a groove that opens to a lower face, and have a substantially H shaped cross-sectional shape. Note that the detection arms 71 and 72 may each include a groove that opens to an upper face and a groove that opens to a lower face, and have a substantially H shaped cross-sectional shape.

As shown in FIG. 3, the electrode 8 includes drive signal electrodes 81 and drive ground electrodes 82, first detection signal electrodes 83, first detection ground electrodes 84, second detection signal electrodes 85, and second detection ground electrodes 86. The drive ground electrodes 82 are ground electrodes of the drive signal electrodes 81, the first detection ground electrodes 84 are ground electrodes of the first detection signal electrodes 83, and the second detection ground electrodes 86 are ground electrodes of the second detection signal electrodes 85.

The drive signal electrodes 81 are arranged on both side faces of the drive arms 75 and 76 and on upper faces and lower faces of the drive arms 77 and 78. On the other hand, the drive ground electrodes 82 are arranged on upper faces and lower faces of the drive arms 75 and 76 and on both side faces of the drive arms 77 and 78. Also, the first detection signal electrodes 83 are arranged on an upper face and a lower face of the detection arm 71, and the first detection ground electrodes 84 are arranged on both side faces of the detection arm 71. On the other hand, the second detection signal electrodes 85 are arranged on an upper face and a lower face of the detection arm 72, and the second detection ground electrodes 86 are arranged on both side faces of the detection arm 72.

Also, these electrodes 81 to 86 are routed to a lower face of the element base 70. Also, a terminal 701 that is electrically connected to the drive signal electrodes 81, a terminal 702 that is electrically connected to the drive ground electrode 82, a terminal 703 that is electrically connected to the first detection signal electrodes 83, a terminal 704 that is electrically connected to the first detection ground electrodes 84, a terminal 705 that is electrically connected to the second detection signal electrodes 85, and a terminal 706 that is electrically connected to the second detection ground electrodes 86 are arranged on the lower face of the element base 70, as shown in FIG. 3.

Such a vibrator element 6 detects the angular velocity ωe as follows. First, when a drive signal is applied between drive signal electrodes 81 and drive ground electrodes 82, the drive arms 75 to 78 performs flexural vibration in a plane parallel to the A and B axes and along the A axis, as shown in FIG. 6. Hereinafter, this drive mode is referred to as a drive vibration mode. Then, if an angular velocity ωe is applied to the vibrator element 6 in a state in which driving is performed in the drive vibration mode, a detection vibration mode shown in FIG. 7 is newly excited. In the detection vibration mode, a Coriolis force is acted on the drive arms 75 to 78, vibration in the direction shown by arrows D is excited, and a detection vibration due to flexural vibration occurs in the detection arms 71 and 72, in response to this vibration, in the direction shown by arrows E. The charges generated in the detection arm 71, in such a detection vibration mode, are extracted from between the first detection signal electrodes 83 and the first detection ground electrodes 84 as a first detection signal, the charges generated in the detection arm 72 are extracted from between the second detection signal electrodes 85 and the second detection ground electrodes 86 as a second detection signal, and the angular velocity ωc can be detected based on these first and second detection signals.

Returning to FIG. 1, the circuit element 3 is fixed to the bottom face of the recess 211c. The circuit element 3 includes a drive circuit and a detection circuit that drive the vibrator element 6 and detect the angular velocity ωc applied to the vibrator element 6. Note that the circuit element 3 is not specifically limited, and may include other circuits such as a temperature compensation circuit, for example.

Also, as shown in FIG. 2, the support substrate 4 includes a base portion 40 serving as an element support, a support portion 41 serving as a base mount having a frame shape surrounding the base portion 40, a pair of beams 42 and 43 that connect between the base portion 40 and the support portion 41 on an A axis plus side, and a pair of beams 44 and 45 that connect between the base portion 40 and the support portion 41 on an A axis minus side. That is, the base portion 40 is supported from its both sides by the beams 42 and 43 and the beams 44 and 45. Note that, in the following, a portion, of the support portion 41, that is connected to the beams 42 and 43 and is on the A axis plus side of the base portion 40 is also referred to as a first support portion 411, a portion, of the support portion 41, that is connected to the beams 44 and 45 and is on the A axis minus side of the base portion 40 is also referred to as a second support portion 412, and a pair of portions that connect between the first support portion 411 and the second support portion 412 are also referred to as a first connection portion 413 and a second connection portion 414.

In such a support substrate 4, the element base 70 of the vibrator element 6 is fixed to the base portion 40 through conductive bonding members B2, and the first and second support portions 411 and 412 are fixed to the bottom face of the recess 211a through the bonding members B1. As a result of interposing the support substrate 4 between the vibrator element 6 and the base 21, stress transmitted from the base 21 is absorbed and alleviated by the support substrate 4, and the stress is unlikely to be transmitted to the vibrator element 6. Therefore, the degradation or fluctuation of the vibration characteristics of the vibrator element 6 can be effectively suppressed.

Note that the material of the bonding members B1 and B2 is not specifically limited as long as the material has conductivity and bondability, and various metal bumps such as an Au bump, an Ag bump, a Cu bump, and a solder bump, conductive adhesives in which conductive fillers such as an Ag fillers are dispersed in various adhesives such as polyimide based, epoxy based, silicone based, and acrylic based adhesives can be used, for example. When the former metal bump is used as the bonding members B1 and B2, generation of gas from the bonding members B1 and B2 can be suppressed, and the change in environment, specifically the increase in pressure, in the internal space S can be effectively suppressed. On the other hand, when the latter conductive adhesive is used as the bonding members B1 and B2, the bonding members B1 and B2 become relatively soft, and the stress described above can be absorbed and alleviated in the bonding members B1 and B2 as well.

In the present embodiment, conductive adhesives are used as the bonding members B1 and metal bumps are used as the bonding members B2. As a result of using an conductive adhesive as the bonding members B1 that bond the support substrate 4 to the base 21 whose materials are different, the thermal stress caused due to the difference in the coefficient of thermal expansion between these materials can be effectively absorbed and alleviated by the bonding member B1. On the other hand, because the support substrate 4 and the vibrator element 6 are bonded by the six bonding members B2 that are arranged in a relatively narrow region, as a result of using metal bumps as the bonding members B2, wet spreading that occurs when a conductive adhesive is used can be suppressed, and the bonding members B2 can be effectively suppressed from being brought into contact to each other.

The beams 42, 43, 44, and 45 each include a portion that meanders in an S-like shape at the middle thereof, and have a shape that easily elastic-deforms in the direction along the A axis and the direction along the B axis. As a result of the beams 42 to 45 deforming in the direction along the A axis and the direction along the B axis, the stress transmitted from the base 21 can be effectively absorbed and alleviated. Note that the shapes of the beams 42 to 45 are not specifically limited, and may be a straight shape in which the portion that meanders is omitted, for example. Also, at least one of the beams 42 to 45 may have a different shape from the others.

Such a support substrate 4 is constituted by a quartz crystal substrate. That is, the constituent material of the support substrate 4 is quartz crystal. As a result of constituting the support substrate 4 by a quartz crystal substrate similarly to the vibrator substrate 7, the coefficient of thermal expansion of the support substrate 4 can be made substantially equal to that of the vibrator substrate 7. Therefore, a thermal stress caused by the difference in the coefficient of thermal expansion between the two materials does not substantially occur between the support substrate 4 and the vibrator substrate 7, and the vibrator element 6 is unlikely to receive stress. Therefore, the degradation or fluctuation of the vibration characteristics of the vibrator element 6 can be more effectively suppressed.

Specifically, the support substrate 4 is constituted by a quartz crystal substrate with the same cut angle as that of the vibrator substrate 7 included in the vibrator element 6. In the present embodiment, since the vibrator substrate 7 is constituted by a Z-cut quartz crystal substrate, the support substrate 4 is also constituted by a Z-cut quartz crystal substrate. Also, the direction of the crystal axis of the support substrate 4 matches the direction of the crystal axis of the vibrator substrate 7. That is, between the support substrate 4 and the vibrator substrate 7, the X axis matches, the Y axis matches, and the Z axis matches. The coefficient of thermal expansion of the quartz crystal is different between the direction along the X axis, the direction along the Y axis, and the direction along the Z axis, and therefore, as a result of the support substrate 4 and the vibrator substrate 7 being constituted by quartz crystal substrates with the same cut angle, and the directions of crystal axes being matched to each other, the thermal stress described above is more unlikely to occur between the support substrate 4 and the vibrator substrate 7. Therefore, the vibrator element 6 is more unlikely to receive stress, and the degradation or fluctuation of the vibration characteristics thereof can be more effectively suppressed.

Note that the support substrate 4 is not limited thereto, and may be a quartz crystal substrate with the same cut angle as that of the vibrator substrate 7, but with a crystal axis direction different from that of the vibrator substrate 7, for example. Also, the support substrate 4 may also be constituted by a quartz crystal substrate with a cut angle different from that of the vibrator substrate 7. Also, the constituent material of the support substrate 4 is not limited to the quartz crystal, and silicon (Si) or various resin materials may also be used, for example. In this case, the constituent material of the support substrate 4 is preferably a material having a coefficient of thermal expansion that differs from that of quartz crystal by an amount smaller than the difference in the coefficient of thermal expansion between the quartz crystal and the constituent material of the base 21.

Also, a wiring pattern 5 for electrically connecting the vibrator element 6 and the internal terminals 241 are provided in the support substrate 4. The wiring pattern 5 includes a drive signal wiring 51 that electrically connects between the terminal 701 and an internal terminal 241, a drive ground wiring 52 that electrically connects between the terminal 702 and an internal terminal 241, a first detection signal wiring 53 that electrically connects between the terminal 703 and an internal terminal 241, a detection ground wiring 54 that electrically connects between the terminals 704 and 706 and an internal terminal 241, and a second detection signal wiring 55 that electrically connects between the terminal 705 and an internal terminal 241.

As shown in FIGS. 8 and 9, the drive signal wiring 51 is routed from the base portion 40 to a lower face of the second support portion 412 through lower faces of the beams 44 and 45. Also, the first detection signal wiring 53 is routed from the base portion 40 to a lower face of the support portion 41 through a lower face of the beam 43. Also, the second detection signal wiring 55 is routed from the base portion 40 to the lower face of the support portion 41 through a lower face of the beam 42. As a result of adopting such an arrangement, the drive signal wiring 51 can be arranged so as to be sufficiently separated from the first and second detection signal wirings 53 and 55. Therefore, the noise interference between the drive signal wiring 51 and the first and second detection signal wirings 53 and 55 can be suppressed. As a result, a highly accurate detection signal with a high S/N ratio can be transmitted to the circuit element 3, and the angular velocity we can be more highly accurately detected.

On the other hand, the drive ground wiring 52 and the detection ground wiring 54 whose potentials are fixed are arranged so as to cover, as extensive as possible, a portion of the support substrate 4 exposed from the other wirings 51, 53, and 55, that is, a portion of the support substrate 4 in which the wirings 51, 53, and 55 are not formed, while securing the electrically insulated state from the wirings 51, 53, and 55.

The detection ground wiring 54 is routed from the base portion 40 to a lower face of the second support portion 412 through upper faces and side faces of the beams 44 and 45. The detection ground wiring 54 is further arranged in a region excluding the first support portion 411 of the support portion 41, that is, over an extensive range of the second support portion 412 and the first and second connection portions 413 and 414. Specifically, the detection ground wiring 54 is arranged in almost the entire region of upper faces of the second support portion 412 and the first and second connection portions 413 and 414.

The drive ground wiring 52 is routed from the base portion 40 to a lower face of the first support portion 411 through upper faces and side faces of the beams 42 and 43. The drive ground wiring 52 is further arranged over an extensive range of the first support portion 411. Specifically, the drive ground wiring 52 is arranged in almost the entire region of an upper face of the first support portion 411.

According to such a configuration, the drive ground wiring 52 can be arranged between the drive signal electrodes 81 arranged on the drive arms 75 and 76 and the first and second detection signal wirings 53 and 55 that are arranged on the lower faces of the beams 42 and 43. Because the drive ground wiring 52 is connected to ground, that is, a fixed potential, the drive ground wiring 52 functions as a shield layer. Therefore, the noise interference between the drive signal electrodes 81 arranged in the vibrator element 6 and the first and second detection signal wirings 53 and 55 that are arranged in the beams 42 and 43 can be suppressed. As a result, a highly accurate detection signal with a high S/N ratio can be transmitted to the circuit element 3, and the angular velocity we can be more highly accurately detected.

The wiring pattern 5 has been described above. In the vibrator device 1, the vibrator element 6 and the support substrate 4 are arranged so as to overlap in the direction along the C axis, and a gap G therebetween is relatively small. Therefore, when the drive arms 75 to 78 and the detection arms 71 and 72 are bent toward the support substrate 4 due to an impact from the outside, for example, the drive arms 75 to 78 and the detection arms 71 and 72 are likely to come into contact with the support substrate 4, and there is a risk that the drive arms 75 to 78 and the detection arms 71 and 72 are damaged due to the contact. Therefore, a buffer member 9 is arranged in the vibrator device 1 for suppressing the damage of the drive arms 75 to 78 and the detection arms 71 and 72 by alleviating the impact when the drive arms 75 to 78 and the detection arms 71 and 72 are brought into contact with the support substrate 4. The buffer member 9 will be described in the following.

As shown in FIG. 10, the buffer member 9 is formed on the wiring pattern 5, specifically on the detection ground wiring 54. Also, the buffer member 9 is provided on the upper face of the support substrate 4, that is, on a face on the vibrator element 6 side, at portions that overlap, in a plan view in the direction along the C axis, the tip end portions of the drive arms 75 to 78 and the detection arms 71 and 72, that is, the wide width portions 711, 721, 751, 761, 771, and 781.

Specifically, in a plan view in the direction along the C axis, the tip end portions of the drive arms 75 and 77 and the detection arm 72 overlap the first connection portion 413 of the support substrate 4, and the tip end portions of the drive arms 76 and 78 and the detection arm 71 overlap the second connection portion 414 of the support substrate 4. Therefore, the buffer member 9 is provided on an upper face of the first connection portion 413 and on an upper face of the second connection portion 414. Here, since the detection ground wiring 54 is arranged on the upper faces of the first connection portion 413 and the second connection portion 414, as described above, the buffer member 9 is arranged on the detection ground wiring 54.

The buffer member 9 includes, in a plan view in the direction along the C axis, a first buffering member 91 that overlaps the wide width portion 711 of the detection arm 71, and comes into contact with the wide width portion 711 when the detection arm 71 is bent toward the support substrate 4, a second buffering member 92 that overlaps the wide width portion 721 of the detection arm 72, and comes into contact with the wide width portion 721 when the detection arm 72 is bent toward the support substrate 4, a third buffering member 93 that overlaps the wide width portion 751 of the drive arm 75, and comes into contact with the wide width portion 751 when the drive arm 75 is bent toward the support substrate 4, a fourth buffering member 94 that overlaps the wide width portion 761 of the drive arm 76, and comes into contact with the wide width portion 761 when the drive arm 76 is bent toward the support substrate 4, a fifth buffering member 95 that overlaps the wide width portion 771 of the drive arm 77, and comes into contact with the wide width portion 771 when the drive arm 77 is bent toward the support substrate 4, and a sixth buffering member 96 that overlaps the wide width portion 781 of the drive arm 78, and comes into contact with the wide width portion 781 when the drive arm 78 is bent toward the support substrate 4.

These first to sixth buffering members 91 to 96 each have lower hardness than the support substrate 4. That is, the first to sixth buffering members 91 to 96 are each softer than the support substrate 4. With this, the impact occurring when the detection arm 71 and 72 come into contact with the first and second buffering members 91 or 92 is smaller than the impact occurring when the detection arms 71 and 72 directly come into contact with the support substrate 4, and therefore the damage of the detection arms 71 and 72 can be suppressed. Similarly, the impact occurring when the drive arms 75 to 78 come into contact with the third to sixth buffering members 93 to 96 is smaller than the impact occurring when the drive arms 75 to 78 directly come into contact with the support substrate 4, and therefore the damage of the drive arms 75 to 78 can be suppressed. Note that the "hardness" means the surface hardness, specifically, Brinell hardness, Rockwell hardness, Vickers hardness, Shore hardness, or the like.

The hardness of the first to sixth buffering members 91 to 96 is not specifically limited, as long as being lower than the hardness of the support substrate 4, and it is preferably 80% or lower of the hardness of the support substrate 4, more preferably 60% or lower, and further more preferably 40% or lower, for example. With this, the first to sixth buffering members 91 to 96 become softer, and the effects described above can be more notably exerted.

Also, the constituent material of the buffer member 9, that is, the first to sixth buffering members 91 to 96, is not specifically limited as long as the hardness thereof being lower than that of the support substrate 4, but metal materials are used in the present embodiment. Specifically, in the present embodiment, the first to sixth buffering members 91 to 96 are each made of gold (Au). As a result of the first to sixth buffering members 91 to 96 being made of gold (Au), the first to sixth buffering members 91 to 96 become sufficiently soft, and a superior impact alleviation effect can be exerted. Also, the thickness of the first to sixth buffering members 91 to 96 is not specifically limited, but the thickness can be about 1 μm to 5 μm, for example. With this, the first to sixth buffering members 91 to 96 can be suppressed from becoming excessively thick while the first to sixth buffering members 91 to 96 reliably exerting the impact alleviation effect.

Also, as a result of the first to sixth buffering members 91 to 96 being made of a metal material, the first to sixth buffering members 91 to 96 can be electrically connected to the detection ground wiring 54. That is, the first to sixth buffering members 91 to 96 are connected to ground through the detection ground wiring 54. With this, charging up of the first to sixth buffering members 91 to 96 can be suppressed, and the noise interference between the first and second detection signal electrodes 83 and 85 arranged in the vibrator element 6 and the first to sixth buffering members 91 to 96 can be suppressed, for example. As a result, a highly accurate detection signal with a high S/N ratio can be transmitted to the circuit element 3, and the angular velocity we can be more highly accurately detected.

Note that, in the present embodiment, the first to sixth buffering members 91 to 96 are each constituted by one layer film made of gold (Au), but there is no limitation thereto, and may be constituted by a film in which a plurality of layers are stacked, for example. In this case, it is sufficient that at least the outermost layer of the plurality of layers is made of a soft material such as gold (Au).

As described above, the buffer member 9 is divided into portions that are arranged so as to respectively correspond to the wide width portions 711, 721, 751, 761, 771, and 781, and therefore the volume of the buffer member 9 is reduced, and the material cost of the buffer member 9 can be reduced by an amount corresponding to the reduction amount of the volume. However, there is no limitation thereto, and the second, third, and the fifth buffering members 92, 93, and 95 that are located on the first connection portion 413 may be integrally formed, and the first, fourth, and sixth buffering members 91, 94, and 96 that are located on the second connection portion 414 may be integrally formed, for example. Also, the buffer member 9 may be formed in a frame shape, and the first to sixth buffering members 91 to 96 may be integrally formed.

Also, in the present embodiment, in a plan view in the direction along the C axis, the first buffering member 91 is arranged so as to overlap the tip end portion of the detection arm 71, specifically a most tip end portion P1 located outermost on a B axis minus side. The displacement amount of the detection arm 71 increases toward the tip end side of the detection arm 71 when being bent in the direction along the C axis, and the detection arm 71 is likely to come into contact with the support substrate 4, and therefore, as a result of arranging the first buffering member 91 so as to overlap the most tip end portion P1 of the detection arm 71, when the detection arm 71 is bent in the direction along the C axis, the detection arm 71 can be reliably brought into contact with the first buffering member 91. Specifically, in the present embodiment, the most tip end portion P1 has a straight-line shape extending along the A axis, and the entire region of the most tip end portion P1 overlaps the first buffering member 91. With this, the contact area between the detection arm 71 and the first buffering member 91 can be increased, and the impact at the time of contact can be further alleviated.

Similarly, in a plan view in the direction along the C axis, the second buffering member 92 is arranged so as to overlap a most tip end portion P2, of the detection arm 72, that is located outermost on a B axis plus side. Specifically, in the present embodiment, the most tip end portion P2 has a straight-line shape extending along the A axis, and the entire region thereof overlaps the second buffering member 92. Also, the third buffering member 93 is arranged so as to overlap a most tip end portion P3, of the drive arm 75, that is located outermost on the B axis plus side. Specifically, in the present embodiment, the most tip end portion P3 has a straight-line shape extending along the A axis, and the entire region thereof overlaps the third buffering member 93. Also, the fourth buffering member 94 is arranged so as to overlap a most tip end portion P4, of the drive arm 76, that is located outermost on the B axis minus side. Specifically, in the present embodiment, the most tip end portion P4 has a straight-line shape extending along the A axis, and the entire region thereof overlaps the fourth buffering member 94. Also, the fifth buffering member 95 is arranged so as to overlap a most tip end portion P5, of the drive arm 77, that is located outermost on the B axis plus side. Specifically, in the present embodiment, the most tip end portion P5 has a straight-line shape extending along the A axis, and the entire region thereof overlaps the fifth buffering member 95. Also, the sixth buffering member 96 is arranged so as to overlap a most tip end portion P6, of the drive arm 78, that is located outermost on the B axis minus side. Specifically, in the present embodiment, the most tip end portion P6 has a straight-line shape extending along the A axis, and the entire region thereof overlaps the sixth buffering member 96. Accordingly, with respect to the second to sixth buffering members 92 to 96 as well, the effect similar to that of the first buffering member 91 described above, that is, the superior impact alleviation effect can be exerted.

The vibrator device 1 has been described above. Such a vibrator device 1 includes the vibrator element 6 that includes the vibrator substrate 7 including the detection arms 71 and 72 and the drive arms 75 to 78, serving as the vibrating arms, and the electrode 8 arranged on the vibrator substrate 7, the base 21 serving as the base, the support substrate 4 that includes the support portion 41 serving as a base mount that is fixed to the base 21, the base portion 40 serving as the element support that supports the vibrator element 6, and the beams 42, 43, 44, and 45 that connect between the support portion 41 and the base portion 40, and supports the vibrator element 6 relative to the base 21, the wiring pattern 5 that is arranged on the support substrate 4 and is electrically connected to the vibrator element 6, and the buffer member 9 that is arranged on the wiring pattern 5 of the support substrate 4 and whose hardness is lower than that of the support substrate 4. Also, the buffer member 9 is arranged on a side, of the support substrate 4, opposing the vibrator element 6, that is, on an upper face side, and overlaps the detection arms 71 and 72 and the drive arms 75 to 78 in a plan view of the support substrate 4, that is, in a plan view in the direction along the C axis.

As a result of adopting such a configuration, when the detection arms 71 and 72 and the drive arms 75 to 78 are bent toward the support substrate 4, the detection arms 71 and 72 and the drive arms 75 to 78 can be brought into contact with the buffer member 9 that is softer than the support substrate 4. Therefore, the impact at the time of contact can be alleviated, and the detection arms 71 and 72 and the drive arms 75 to 78 can be effectively suppressed from being damaged.

Also, as described above, the buffer member 9 overlaps, in a plan view of the support substrate 4, the tip end portions of the detection arms 71 and 72 and the drive arms 75 to 78, specifically the most tip end portions P1 to P6. Accordingly, when the detection arms 71 and 72 and the drive arms 75 to 78 are bent toward the support substrate 4, the detection arms 71 and 72 and the drive arms 75 to 78 can be more reliably brought into contact with the buffer member 9.

Also, as described above, the constituent material of the vibrator substrate 7 is quartz crystal, and the constituent material of the support substrate 4 is quartz crystal. In this way, as a result of using the same material for the support substrate 4 and the vibrator substrate 7, the coefficients of thermal expansion of the support substrate 4 and the vibrator substrate 7 are substantially the same. Therefore, the thermal stress caused by the difference in the coefficient of thermal expansion will not be substantially generated between the support substrate 4 and the vibrator substrate 7, and the vibrator element 6 is more unlikely to receive stress. Therefore, the degradation or fluctuation of the vibration characteristics of the vibrator element 6 can be more effectively suppressed.

Also, as described above, the constituent material of the buffer member 9 is metal. With this, the buffer member 9 that is sufficiently soft can be obtained.

Also, as described above, the wiring pattern 5 includes the detection ground wiring 54 serving as fixed potential wiring that is connected to a fixed potential, and the buffer member 9 is electrically connected to the detection ground wiring 54. With this, charging up of the buffer member 9 is suppressed, and the noise interference between the buffer member 9 and the electrode 8 arranged in the vibrator element 6, specifically the first and second detection signal electrodes 83 and 85 can be suppressed.

Also, as described above, when three axes orthogonal to each other are denoted as an A axis, a B axis, and a C axis, the vibrator element 6 and the support substrate 4 are arranged so as to overlap in the direction along the C axis. Also, the vibrator substrate 7 includes the element base 70, the pair of detection arms 71 and 72 serving as vibrating arms that extend from the element base 70 along the B axis, the pair of linking arms 73 and 74 that extend from the element base 70 along the A axis, the pair of drive arms 75 and 76 serving as vibrating arms that extend from the tip end portion of one linking arm 73 along the B axis, and the pair of drive arms 77 and 78 serving as vibrating arms that extend from the tip end portion of the other linking arm 74 along the B axis, and the element base 70 is fixed to the base portion 40 through the bonding members B2. As a result of adopting the vibrator substrate 7 having such a shape, the vibrator element 6 having a superior vibration balance and high angular velocity detection characteristics can be obtained.

Second Embodiment

Figure 11:
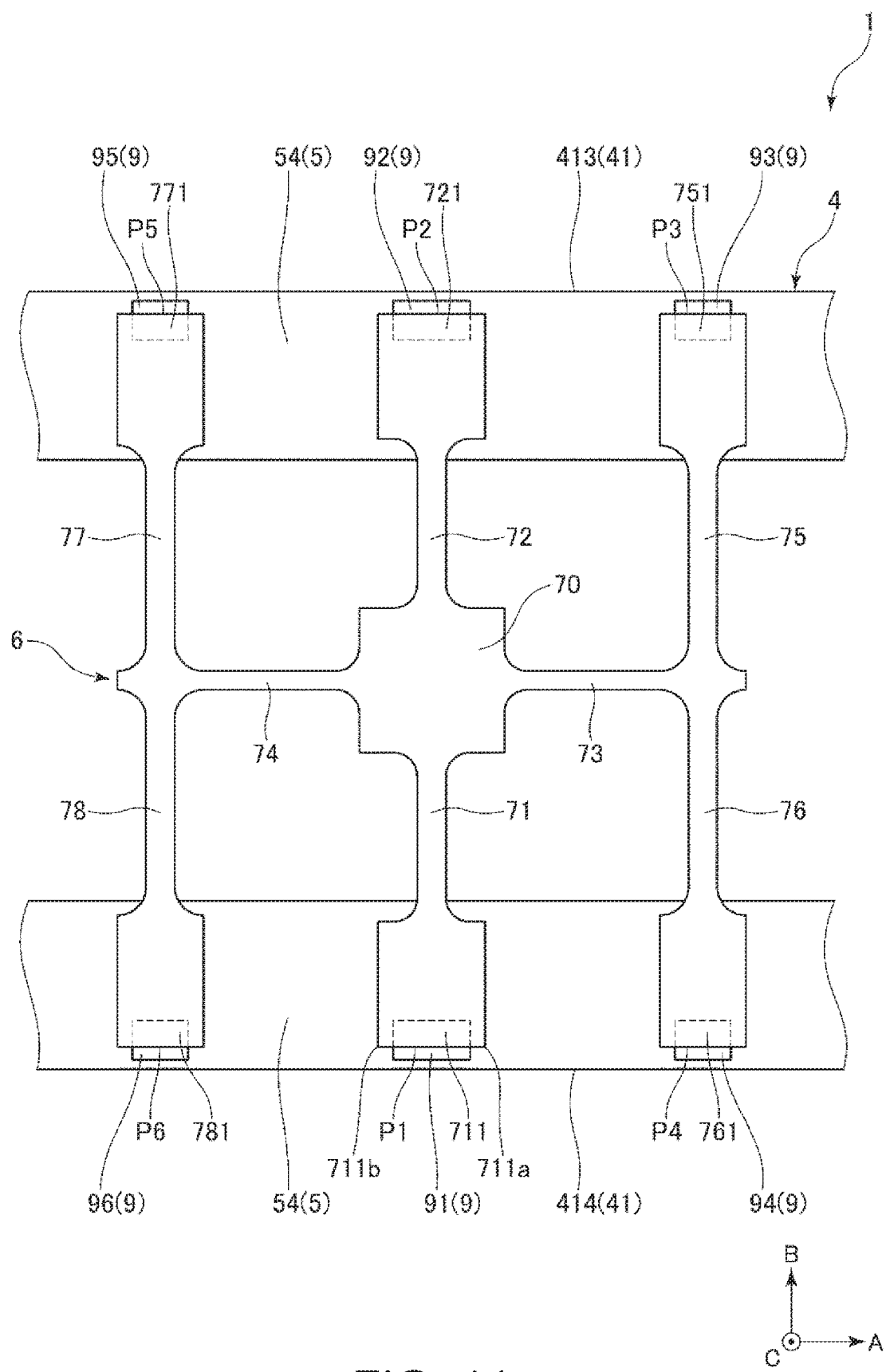
FIG. 11 is a plan view, viewed from the above, of a support substrate included in a vibrator device of a second embodiment.

FIG. 11 is a plan view, viewed from the above, of a support substrate included in a vibrator device of a second embodiment.

The present embodiment is similar to the first embodiment described above other than that the configuration of the buffer member 9 is different. Note that, in the following description, with respect to the present embodiment, the difference from the embodiment described above will be mainly described, and the description regarding similar items will be omitted. Also, in FIG. 11, the constituent elements similar to those in the embodiment described above are given the same reference signs. Note that, in the present embodiment, because first to sixth buffering members 91 to 96 are similarly configured to each other, the first buffering member 91 will be described in the following as a representative of the buffering members, and the description of the other second to sixth buffering members 92 to 96 will be omitted.

As shown in FIG. 11, in the present embodiment, the first buffering member 91 does not overlap, in a plan view in the direction along the C axis, corner portions 711*a* and 711*b* located at a tip end portion of the detection arm 71. In other words, the first buffering member 91 overlaps only a central portion that does not include both end portions of the most tip end portion P1. According to such a configuration, when the detection arm 71 is bent toward the support substrate 4, the corner portions 711*a* and 711*b* do not come into contact with the first buffering member 91. The corner portions 711*a* and 711*b* are portions in which stress concentration is likely to occur, and therefore, as a result of the corner portions 711*a* and 711*b* being not brought into contact with the first buffering member 91, the detection arm 71 can be effectively suppressed from being damaged by the impact when the detection arm 71 comes into contact with the first buffering member 91. The same applies to the second to sixth buffering members 92 to 96.

As described above, the first buffering member 91 included in the buffer member 9 does not overlap, in a plan view of the support substrate 4, the corner portions 711*a* and 711*b* located at the tip end portion of the detection arm 71. The same applies to the second to sixth buffering members 92 to 96. With this, the detection arms 71 and 72 and the drive arms 75 to 78 can be effectively suppressed from being damaged by the impact when the detection arms 71 and 72 and the drive arms 75 to 78 come into contact with the buffering member 9.

With the second embodiment as described above as well, the effect similar to that of the first embodiment described above can be exerted.

Third Embodiment

Figure 12:
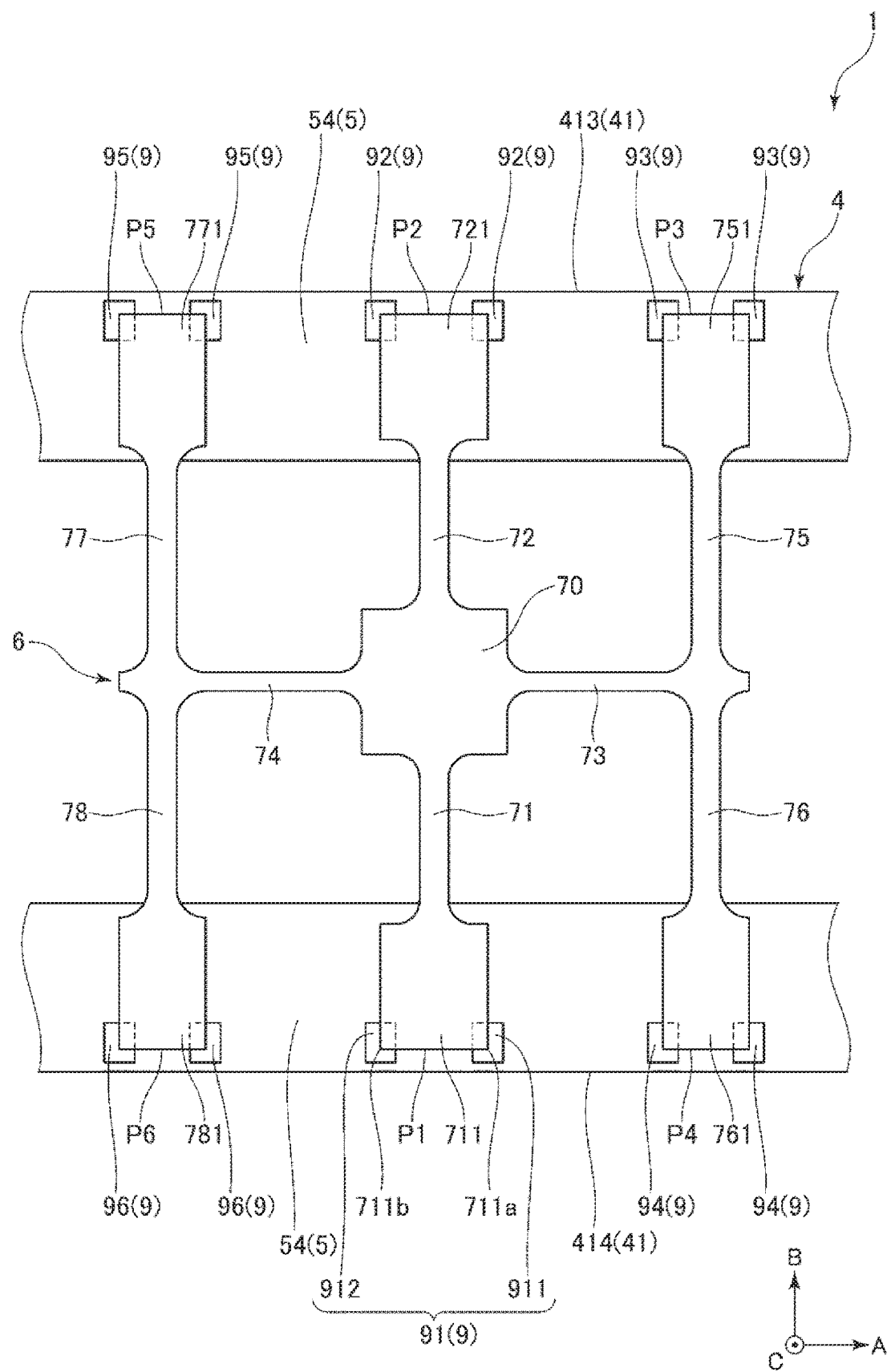
FIG. 12 is a plan view, viewed from the above, of a support substrate included in a vibrator device of a third embodiment.

FIG. 12 is a plan view, viewed from the above, of a support substrate included in a vibrator device of a third embodiment.

The present embodiment is similar to the first embodiment described above other than that the configuration of the buffer member 9 is different. Note that, in the following description, with respect to the present embodiment, the difference from the embodiments described above will be mainly described, and the description regarding similar items will be omitted. Also, in FIG. 12, the constituent elements similar to those in the embodiments described above are given the same reference signs. Note that, in the present embodiment, because first to sixth buffering members 91 to 96 are similarly configured to each other, the first buffering member 91 will be described in the following as a representative of the buffering members, and the description of the other second to sixth buffering members 92 to 96 will be omitted.

As shown in FIG. 12, in the present embodiment, the first buffering member 91 includes a first portion 911 that overlaps, in a plan view in the direction along the C axis, a corner portion 711*a* located on an A axis plus side of the tip end portion of the detection arm 71, that is, on one side in a width direction of the detection arm 71, and a second portion 912 that overlaps a corner portion 711*b* located on an A axis minus side, that is, on the other side in the width direction of the detection arm 71. Also, the first portion 911 and the second portion 912 are arranged so as to be separated from each other in the direction along the A axis. That is, the central portion, in the direction along the A axis, of the tip end portion does not overlap the first buffering member 91.

When the detection arm 71 is bent toward the support substrate 4, twisting of the detection arm 71 about the shaft thereof is likely to occur, and therefore the detection arm 71 comes into contact with the first buffering member 91 from one of the corner portions 711*a* and 711*b* sides. Therefore, as a result of arranging the first buffering member 91 at positions so as to overlap at least the corner portions 711*a* and 711*b*, the detection arm 71 can be reliably brought into contact with the first buffering member 91. Also, as a result of forming a gap between the first portion 911 and the second portion 912, as in the present embodiment, the area of the first buffering member 91 can be reduced relative to the first embodiment described above, and the material cost of the first buffering member 91 can be reduced by an amount corresponding to the reduction amount of the area.

As described above, the first buffering member 91 included in the buffer member 9 includes the first portion 911 that overlaps, in a plan view of the support substrate 4, the corner portion 711a located on the A axis plus side of the tip end portion of the detection arm 71, that is, on one side in the width direction of the detection arm 71, and the second portion 912 that overlaps the corner portion 711b located on the A axis minus side, that is, on the other side in the width direction of the detection arm 71, and the first portion 911 and the second portion 912 are separated to each other in the direction along the A axis. The same applies to the second to sixth buffering members 92 to 96. Accordingly, the area of the buffer member 9 can be reduced relative to the first embodiment described above, and the material cost of the buffer member 9 can be reduced by an amount corresponding to the reduction amount of the area.

With the third embodiment as described above as well, the effect similar to that of the first embodiment described above can be exerted.

Fourth Embodiment

Figure 13:
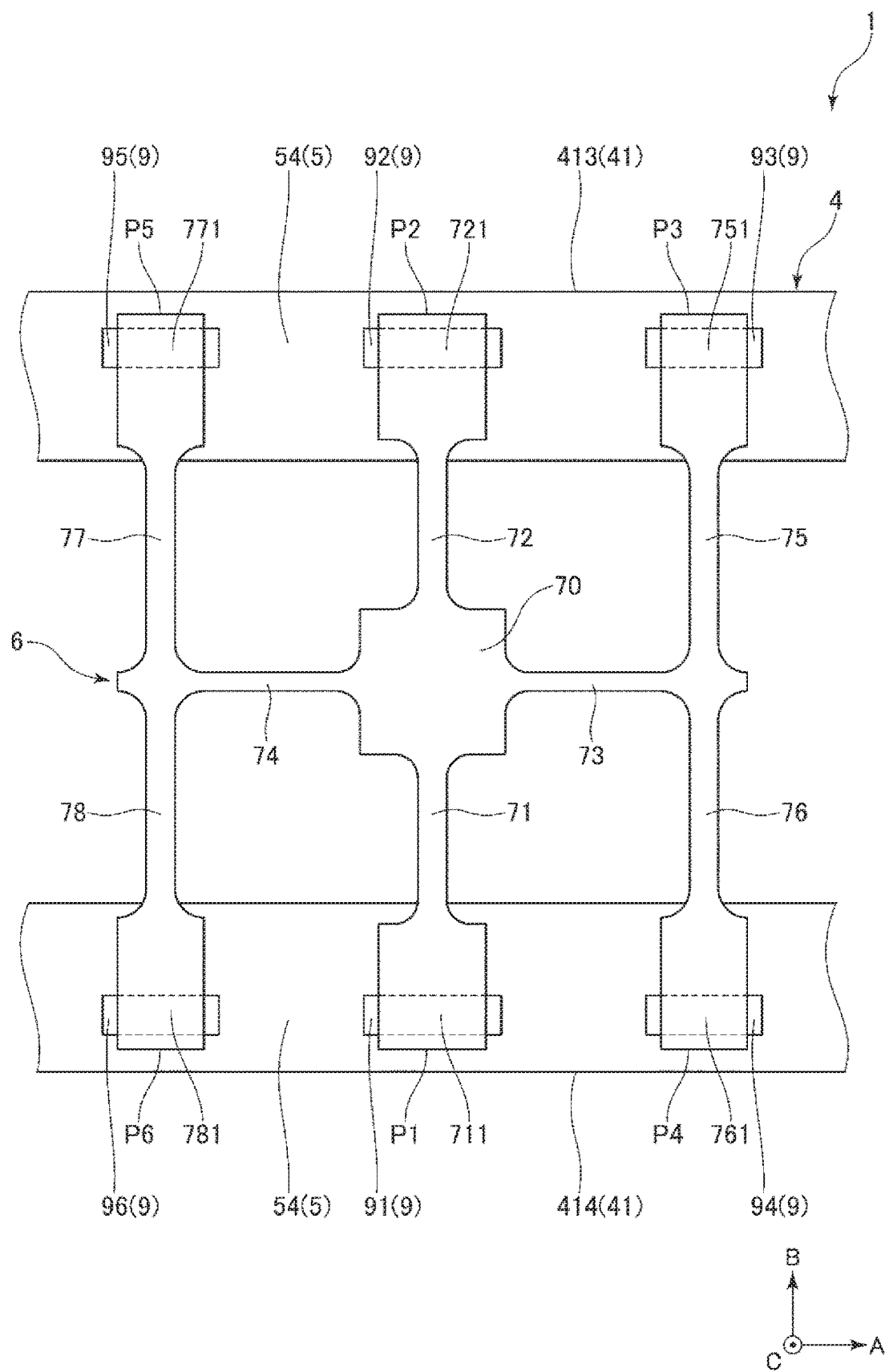
FIG. 13 is a plan view, viewed from the above, of a support substrate included in a vibrator device of a fourth embodiment.

FIG. 13 is a plan view, viewed from the above, of a support substrate included in a vibrator device of a fourth embodiment.

The present embodiment is similar to the first embodiment described above other than that the configuration of the buffer member 9 is different. Note that, in the following description, with respect to the present embodiment, the difference from the embodiments described above will be mainly described, and the description regarding similar items will be omitted. Also, in FIG. 13, the constituent elements similar to those in the embodiments described above are given the same reference signs. Note that, in the present embodiment, because first to sixth buffering members 91 to 96 are similarly configured to each other, the first buffering member 91 will be described in the following as a representative of the buffering members, and the description of the other second to sixth buffering members 92 to 96 will be omitted.

As shown in FIG. 13, in the present embodiment, the first buffering member 91 overlaps, in a plan view in the direction along the C axis, the detection arm 71 at a position shifted from the tip end portion toward a base end of the detection arm 71. That is, the first buffering member 91 does not overlap, in a plan view in the direction along the C axis, the most tip end portion P1, and overlaps a portion located on the base end side relative to the most tip end portion P1. The most tip end portion P1 includes corner portions formed by a lower face and side faces of the vibrator substrate 7, and stress is likely to be concentrated in the corner portions. Therefore, as a result of the most tip end portion P1 being not brought into contact with the first buffering member 91, the detection arm 71 can be more effectively suppressed from being damaged by the impact when the detection arm 71 comes into contact with the first buffering member 91. Note that in a state in which the detection arm 71 is bent toward the support substrate 4, and the detection arm 71 comes into contact with the first buffering member 91, the most tip end portion P1 does not come into contact with any portion. That is, in a state in which the detection arm 71 comes into contact with the first buffering member 91, there is a gap between the most tip end portion P1 and the detection ground wiring 54.

As described above, the first buffering member 91 included in the buffer member 9 overlaps, in a plan view of the support substrate 4, the detection arm 71 at a position shifted from the tip end portion toward the base end of the detection arm 71. The same applies to the second to sixth buffering members 92 to 96. Accordingly, the detection arms 71 and 72 and the drive arms 75 to 78 can be more effectively suppressed from being damaged by the impact when the detection arms 71 and 72 and the drive arms 75 to 78 come into contact with the buffer member 9.

With the fourth embodiment as described above as well, the effect similar to that of the first embodiment described above can be exerted.

Fifth Embodiment

Figure 14:
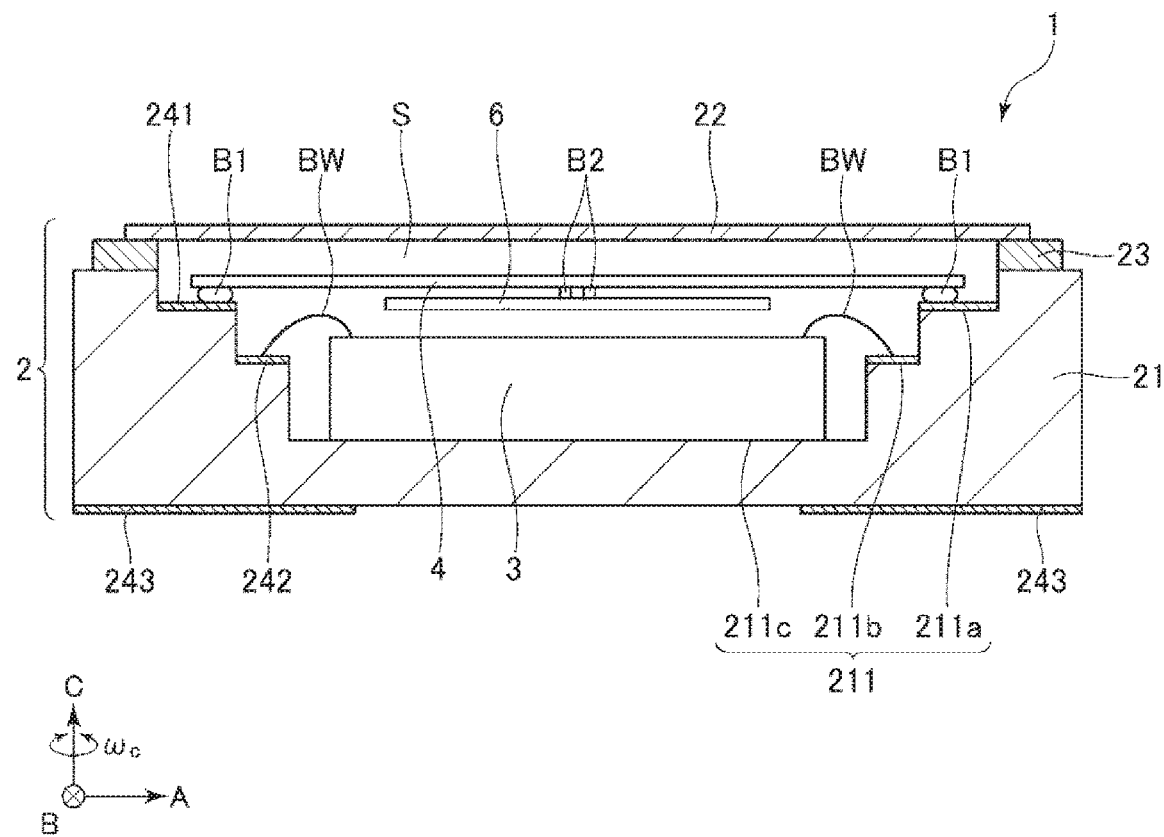
FIG. 14 is a cross-sectional view illustrating a vibrator device of a fifth embodiment.

FIG. 14 is a cross-sectional view illustrating a vibrator device of a fifth embodiment.

The present embodiment is similar to the first embodiment described above other than that the arrangement of the vibrator element 6 is different. Note that, in the following description, with respect to the present embodiment, the difference from the embodiments described above will be mainly described, and the description regarding similar items will be omitted. Also, in FIG. 14, the constituent elements similar to those in the embodiments described above are given the same reference signs.

As shown in FIG. 14, the vibrator element 6 is arranged between the support substrate 4 and the circuit element 3. That is, the vibrator element 6 is located on a lower side of the support substrate 4, and is suspended from and supported by the support substrate 4. According to such a configuration, the vibrator element 6 can be arranged in a space between the support substrate 4 and the circuit element 3, and therefore the reduction in size, specifically in thickness, of the vibrator device 1 can be realized to that extent.

With the fifth embodiment as described above, the effect similar to that of the first embodiment described above can also be exerted.

Sixth Embodiment

Figure 15:
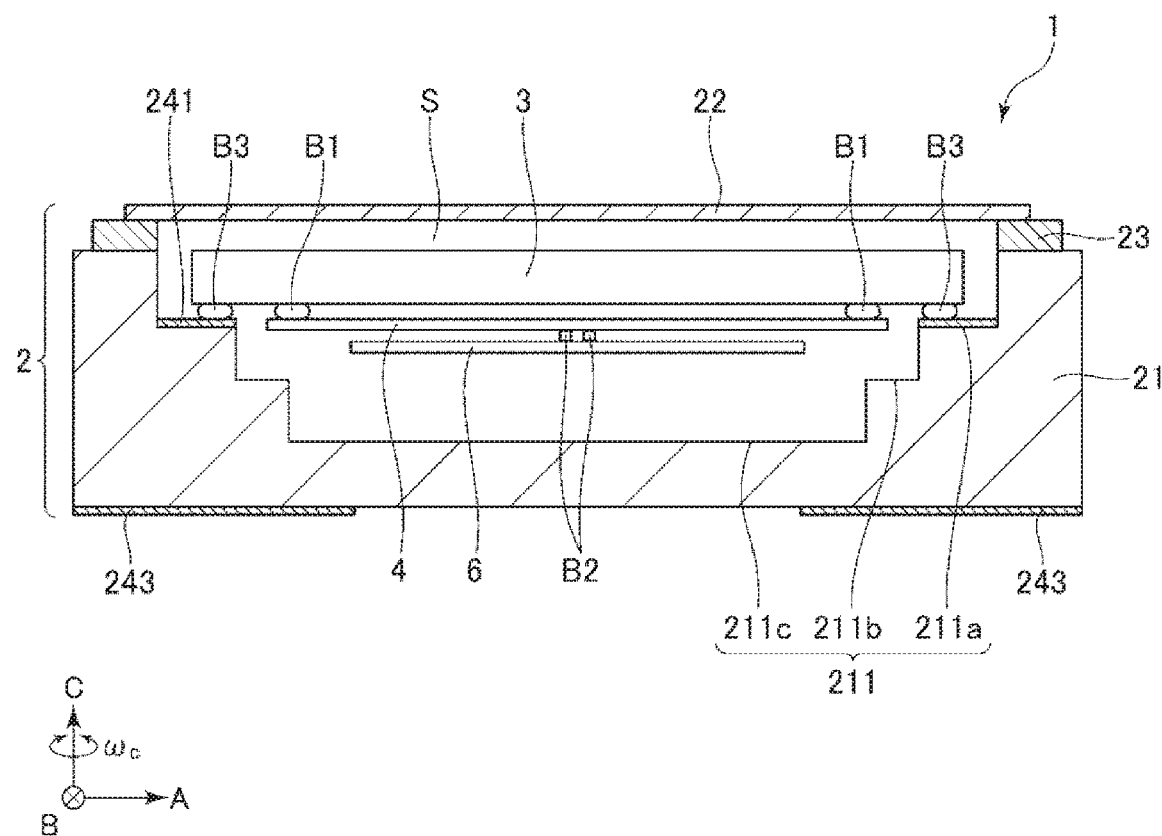
FIG. 15 is a cross-sectional view illustrating a vibrator device of a sixth embodiment.

FIG. 15 is a cross-sectional view illustrating a support substrate included in a vibrator device of a sixth embodiment.

The present embodiment is similar to the fifth embodiment described above other than that the arrangement of the circuit element 3 is different. Note that, in the following description, with respect to the present embodiment, the difference from the embodiments described above will be mainly described, and the description regarding similar items will be omitted. Also, in FIG. 15, the constituent elements similar to those in the embodiments described above are given the same reference signs.

As shown in FIG. 15, in the vibrator device 1 of the present embodiment, the circuit element 3 is fixed to a bottom face of the recess 211a through conductive bonding members B3, the support substrate 4 is fixed to a lower face of the circuit element 3 through bonding members B1, and the vibrator element 6 is fixed to a lower face of the support substrate 4 through bonding members B2. As a result of the vibrator element 6 being fixed to the base 21 via the support substrate 4 and the circuit element 3, stress transmitted from the base 21 can be absorbed and alleviated by the support substrate 4 and the circuit element 3, and the stress is unlikely to be transmitted to the vibrator element 6. Therefore, the degradation or fluctuation of the vibration characteristics of the vibrator element 6 can be more effectively suppressed. Also, according to the present embodiment, the circuit element 3 can be arranged inside the recess 211a, and therefore the size of the circuit element 3 can be increased relative to the case where the circuit element 3 is arranged inside the recess 211c, as in the first embodiment described above.

With the sixth embodiment as described above, the effect similar to that of the first embodiment described above can also be exerted.

The vibrator device of the invention has been described above based on the illustrated embodiments, but the invention is not limited thereto, and the configurations of the units can each be replaced by any configuration having the similar function. Also, any other constituent element may be added to the invention. Also, the embodiments may be appropriately combined.

What is claimed is:

1. A vibrator device comprising:
   a vibrator element that includes a vibrator substrate including a vibrating arm, and an electrode arranged on the vibrator substrate;
   a base;
   a support substrate that includes a base mount fixed to the base, an element support that supports the vibrator element, and a beam that connects between the base mount and the element support, and supports the vibrator element relative to the base;
   a wiring pattern that is arranged on the support substrate, and is electrically connected to the vibrator element; and
   a buffer member that is arranged on the wiring pattern of the support substrate, and whose hardness is lower than that of the support substrate,
   wherein the buffer member is arranged on a face of the support substrate, that opposes the vibrator element, and overlaps the vibrating arm in a plan view of the support substrate,
   the wiring pattern includes fixed potential wiring connected to a fixed potential, and
   the buffer member is electrically connected to the fixed potential wiring.

2. The vibrator device according to claim 1, wherein the buffer member overlaps a tip end of the vibrating arm in a plan view of the support substrate.

3. The vibrator device according to claim 2, wherein the buffer member does not overlap a corner located at the tip end in a plan view of the support substrate.

4. The vibrator device according to claim 2, wherein the buffer member includes a first portion that overlaps, in a plan view of the support substrate, a corner of the tip end located on one side in a width direction of the vibrating arm, and a second portion that overlaps a corner located on the other side, and the first portion and the second portion are separated in the width direction.

5. The vibrator device according to claim 1, wherein the buffer member overlaps, in a plan view of the support substrate, the vibrating arm at a position shifted from a tip end toward a base end of the vibrating arm.

6. The vibrator device according to claim 1,
   wherein the constituent material of the vibrator substrate is quartz crystal, and
   the constituent material of the support substrate is quartz crystal.

7. The vibrator device according to claim 1, wherein the constituent material of the buffer member is metal.

8. The vibrator device according to claim 1,
   wherein when three axes orthogonal to each other are denoted as an A axis, a B axis, and a C axis,
   the vibrator element and the support substrate are arranged so as to overlap in a direction along the C axis, and
   the vibrator element includes:
   an element base fixed to the element support through a bonding member;
   a pair of detection arms, that extend from the element base along the B axis;
   a pair of linking arms that extend from the element base along the A axis;
   a pair of drive arms, that extend from a tip end of one of the linking arms, along the B axis; and
   a pair of drive arms, that extend from a tip end of the other of the linking arms, along the B axis.

* * * * *